United States Patent
Chen

(10) Patent No.: US 12,095,413 B2
(45) Date of Patent: Sep. 17, 2024

(54) SOLAR PANEL FRAME WATERPROOF STRUCTURE

(71) Applicant: Sunny Rich Agric. & Biotech Co., Ltd., Taipei (TW)

(72) Inventor: Kuei-Kuang Chen, Taipei (TW)

(73) Assignee: Sunny Rich Agric. & Biotech Co., Ltd., Taipei (TW)

( * ) Notice: Subject to any disclaimer, the term of this patent is extended or adjusted under 35 U.S.C. 154(b) by 0 days.

(21) Appl. No.: 18/251,590

(22) PCT Filed: Jan. 27, 2021

(86) PCT No.: PCT/CN2021/073884
§ 371 (c)(1),
(2) Date: May 3, 2023

(87) PCT Pub. No.: WO2022/160110
PCT Pub. Date: Aug. 4, 2022

(65) Prior Publication Data
US 2023/0412117 A1    Dec. 21, 2023

(51) Int. Cl.
*H02S 30/10*    (2014.01)
(52) U.S. Cl.
CPC .................... *H02S 30/10* (2014.12)
(58) Field of Classification Search
CPC ...................... H02S 30/10; H02S 20/00–32
See application file for complete search history.

(56) References Cited

U.S. PATENT DOCUMENTS

2020/0403562 A1   12/2020   Wang et al.

FOREIGN PATENT DOCUMENTS

| CN | 204068845 U | * 12/2014 |
| CN | 104453112 A | 3/2015 |

(Continued)

OTHER PUBLICATIONS

English machine translation of Kim (KR 101742153) published Jun. 2017.*

(Continued)

*Primary Examiner* — Christina Chern
(74) *Attorney, Agent, or Firm* — Best & Flanagan LLP

(57) ABSTRACT

A solar panel frame waterproof structure, comprising multiple solar panels (1), multiple frames (2), multiple frame bodies (3), and multiple sealing strips (4). Each of the solar panels (1) has upper and lower surfaces (11, 12) and four side edges (13); each of the frames (2) is provided at the side edge of the solar panel (1), and has an upper bonding plate (21) and a lower bonding plate (22); a vertical plate (24) is connected between the upper bonding plate (21) and the lower bonding plate (22); the vertical plate (24) is non-planar, and is provided with at least one protruding portion (241) facing or away from the direction where the vertical plate (24) is bonded to the solar panel (1); a recessed portion (242) is formed at the side opposite to the protruding portion (241); each of the frame bodies (3) is provided below the frame (2) and is fixedly connected to the lower bonding plate (22); each of the sealing strips (4) is provided between the frames (2) of two adjacent solar panels (1), so that upper and lower barriers can be formed between the vertical plates (24) of the two adjacent frames (2) by the sealing strips (4). Thus, better assembly convenience and waterproof effect can be achieved.

10 Claims, 6 Drawing Sheets

(56) References Cited

FOREIGN PATENT DOCUMENTS

| CN | 106849841 | A | | 6/2017 | | |
|---|---|---|---|---|---|---|
| CN | 208581187 | U | | 3/2019 | | |
| CN | 109921723 | A | | 6/2019 | | |
| CN | 106357205 | B | * | 9/2019 | ............ | E04D 13/16 |
| CN | 211548438 | U | | 9/2020 | | |
| JP | 2007165499 | A | * | 6/2007 | ............ | F24S 25/20 |
| JP | 3138733 | U | * | 1/2008 | ........... | H01L 31/042 |
| KR | 20130028430 | A | | 3/2013 | | |
| KR | 101742153 | B1 | * | 6/2017 | ............ | H02S 20/21 |
| TW | M574218 | U | | 2/2019 | | |
| TW | M576650 | U | | 4/2019 | | |
| TW | M587262 | U | | 12/2019 | | |
| TW | M594310 | U | | 4/2020 | | |
| TW | M599506 | U | | 8/2020 | | |
| TW | M599891 | U | | 8/2020 | | |
| TW | I703298 | B | | 9/2020 | | |

OTHER PUBLICATIONS

English machine translation of Li (JP 3138733) published Jan. 2008.*
English machine translation of Li et al. (CN 106357205) published Sep. 2019.*
English machine translation of Kobayashi (JP 2007-165499) published Jun. 2007.*
English machine translation of Yu (CN 204068845) published Dec. 2014.*

\* cited by examiner

SOLAR PANEL FRAME WATERPROOF STRUCTURE

TECHNICAL FIELD

The present invention relates to a solar panel frame waterproof structure and, more particularly, to a structure that has enhanced installation convenience and is waterproof.

BACKGROUND TECHNIQUE

Solar energy is an energy cleaner than thermal power generation and can reduce air pollution caused by excessive use of thermal power generation. The solar energy generation equipment generally includes a plurality of solar panels arranged on the same plane. The solar panel is a rectangular cuboid and includes four sides coupled with side frames. The side frames can be assembled with a frame to install on the ground or a building. However, gaps through which water may leak exist between side frames of adjacent solar panels, resulting in accumulation of water on the building below the solar panels when it rains. Furthermore, the water vapor accumulated on the side frames will affect the solar panels, causing easy damage to the solar panels.

To improve the water leakage condition between adjacent solar panels, currently, a structure may be disposed between the side frames of two adjacent solar panels, such as disclosed in Taiwan patent numbers TWI703298, TWM599891, TWM594310, TWM576650, and TWM574218. The structure mainly includes an assembling member disposed on upper and lower ends of the side frames of two adjacent solar panels, and the two assembling members are coupled with each other or the side frames to achieve the waterproof purpose. However, the structure has drawbacks of complicated components and difficulties in assembly. Furthermore, the structure disclosed in Taiwan patent numbers TWM599506 and TWM 587262 includes gaskets and plugs on vertical faces of two sides of two adjacent solar panels for waterproof purpose. However, the vertical faces are difficult to be in sealing engagement with the gaskets or plugs, still causing easy water leakage flowing downward along the vertical sides, thereby providing poor waterproofness.

SUMMARY OF THE INVENTION

Technical Problem

An objective of the present invention is to provide a structure that has enhanced installation convenience and is waterproof.

Solution of Problem

Technical Solution

To achieve the above objective, the present invention comprises: a plurality of solar panels, with each of the plurality of solar panels being a rectangular cuboid and including an upper surface, a lower surface, and four side edges; a plurality of side frames made of rigid material, with each of the plurality of side frames disposed on one of the side edges of the solar panel and including an upper coupling plate parallel to the upper surface of the solar panel and coupled with the solar panel and a lower coupling plate parallel to the upper coupling plate and spaced from the lower surface of the solar panel, with a vertical plate connected between the upper coupling plate and the lower coupling plate, with the vertical plate being non-planar and including at least one protruding portion facing or facing away from the solar panel coupled therewith, with a recessed portion formed on a side opposite to the protruding portion; a plurality of frame bodies disposed below the side frames and fixedly connected with the lower coupling plates; and a plurality of sealing strips made of soft waterproof material, with each of the plurality of sealing strips disposed between the side frames of two adjacent solar panels, and with the sealing strip disposed between the vertical plates of the two adjacent side frames to form vertically insulation.

Preferably, wherein the vertical plate of the side frame includes at least one protruding portion facing the solar panel coupled therewith, a side opposite to the protruding portion includes a recessed portion facing the solar panel coupled therewith, and a flange is provided on the sealing strip in a position corresponding to the recessed portion of the vertical plate of the side frame for sealing engagement with the recessed portion.

Preferably, wherein the vertical plate of the side frame includes at least one protruding portion facing away from the solar panel coupled therewith, a side opposite to the protruding portion includes a recessed portion facing away from the solar panel coupled therewith, and a groove is provided on the sealing strip in a position corresponding to the protruding portion of the vertical plate of the side frame for sealing engagement with the protruding portion.

Preferably, wherein the sealing strip includes a vertical section disposed between the vertical plates of two adjacent side frames, an upper sealing portion protrudes from an upper end of the upper section, protrudes above the two adjacent side frames, and abuts the upper coupling plates of the two side frames.

Preferably, wherein the protruding portions of the vertical plates of the side frames of two adjacent solar panels respectively faces and faces away from the solar panels coupled therewith, and the recessed portion of one of the side frames corresponds to a position of the protruding portion of the other side frame, and the sealing strip includes a flange for sealing engagement with the recessed portion of one of the side frames and a groove for sealing engagement with the protruding portion of the other side frame.

Preferably, wherein a clamping plate is provided on the side frame and below the upper coupling plate and is for clamping the lower surface of the solar panel.

Preferably, wherein the side frames are made of aluminum.

Preferably, wherein the sealing strips are made of rubber material.

Advantageous Effects of the Invention

Advantageous Effects

By adopting the above solution, the vertical plate of the side frame of the present invention includes protruding portions which can form ribs to increase the strength of the side frame while increasing the bending strength of the side frame and the solar panel. Furthermore, in the present invention, a sealing strip is in sealing engagement with two adjacent side frames. The assembly is easier and simpler. Furthermore, the sealing strip is in sealing engagement with the non-planer vertical plate of the side frame, achieving improved assembly stability and sealingness. Furthermore, the sealing strip can have buffering and shock-absorbing effect.

BRIEF DESCRIPTION OF THE ACCOMPANYING DRAWINGS

DESCRIPTION OF THE ACCOMPANYING DRAWINGS

Reference number: 1 solar panel; 11 upper surface; 12 lower surface; 13 side edge; 2 side frame; 21 upper coupling plate; 22 lower coupling plate; 23 clamping plate; 24 vertical plate; 241 protruding portion; 242 recessed portion; 3 frame body; 4 sealing strip; 41 flange; 42 vertical section; 43 upper sealing portion; 44 groove

EMBODIMENTS OF THE INVENTION

Implementation of the Present Invention

Figure 1:
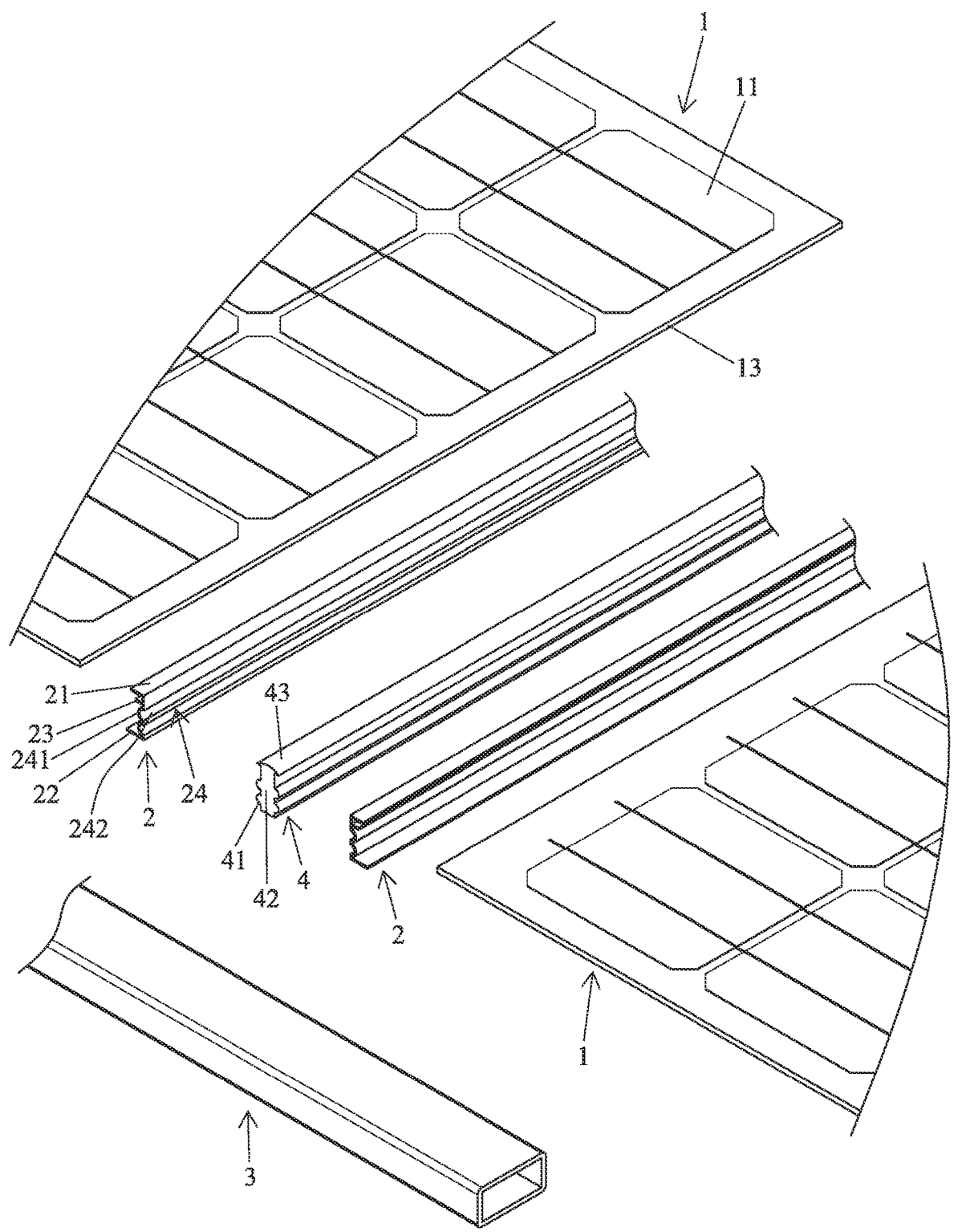
FIG. 1 is a partial, exploded, perspective view of a first embodiment of the present invention.
Figure 2:
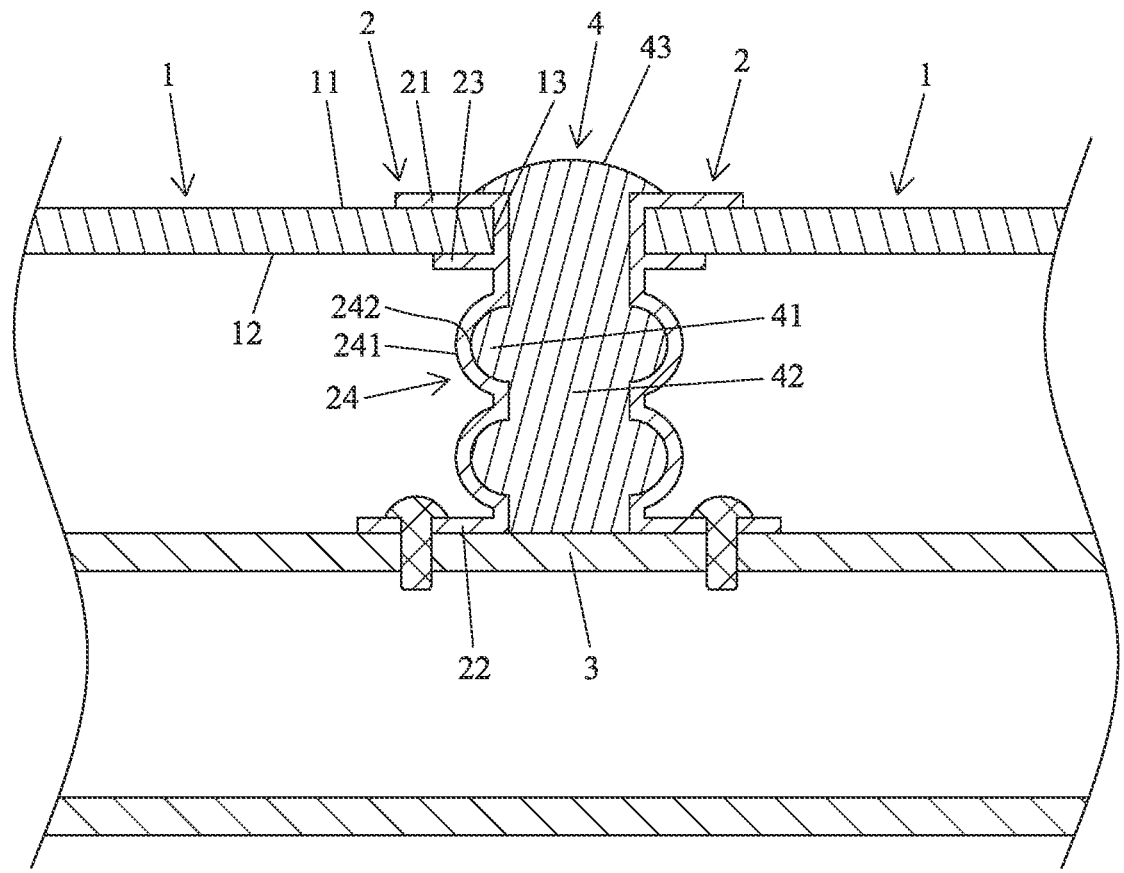
FIG. 2 is a partial cross-sectional view of the first embodiment of the present invention after assembly.
Figure 3:
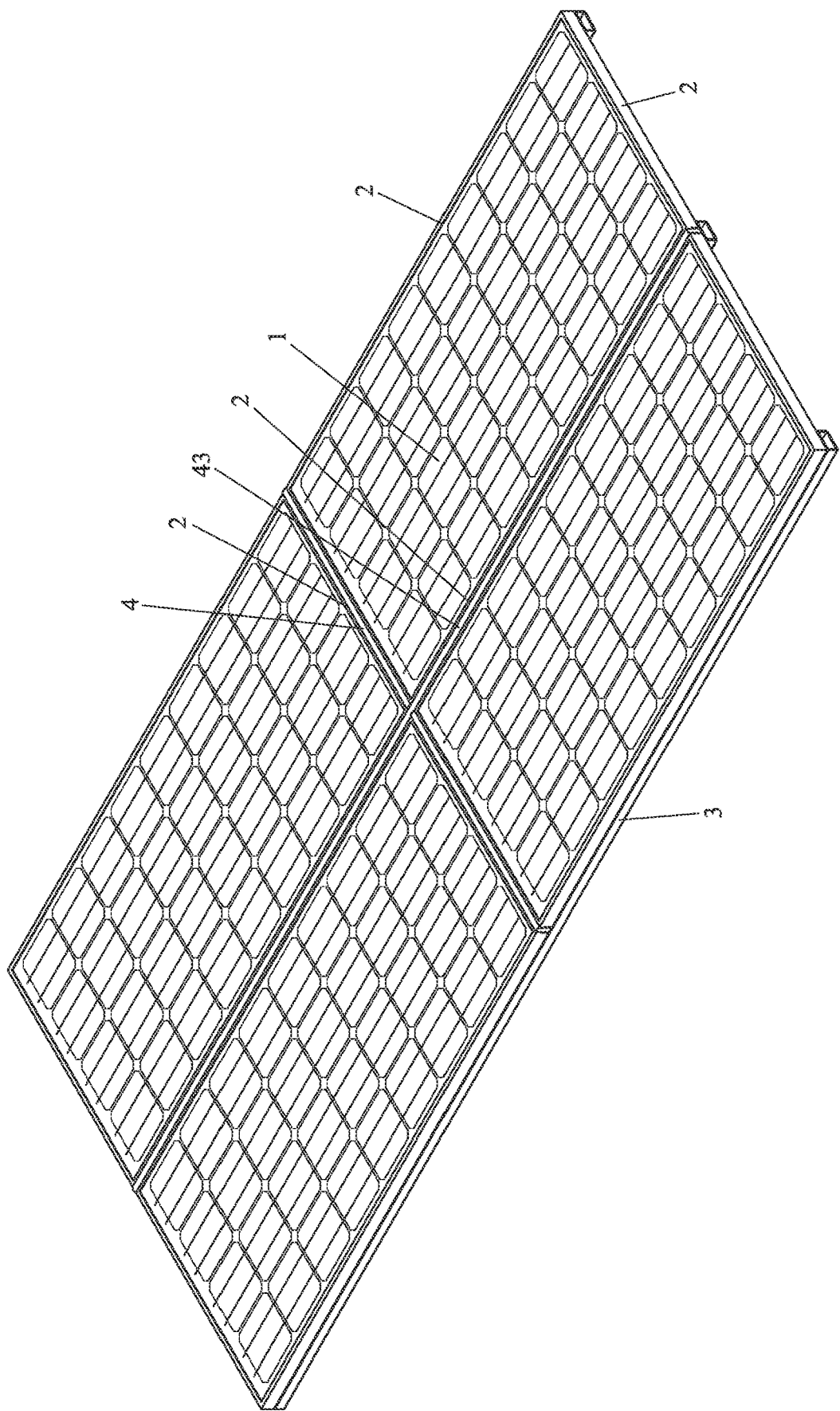
FIG. 3 is a perspective view of the first embodiment of the present invention after assembly.

In each of the following embodiments, components of the present invention having similar functions are designed by similar reference numbers. Please refer to FIGS. 1 to 3. A first embodiment of the present invention comprises a plurality of solar panels 1, a plurality of side frames 2, a plurality of frame bodies 3, and a plurality of sealing strips 4. The solar panel 1 is a rectangular cuboid and includes an upper surface 11, a lower surface 12, and four side edges 13.

The plurality of side frames 2 is made of aluminum or other rigid material. Each of the plurality of side frames 2 is disposed on one of the side edges 13 of the solar panel 1 and includes an upper coupling plate 21 parallel to the upper surface 11 of the solar panel 1 and coupled with the solar panel 1 and a lower coupling plate 22 parallel to the upper coupling plate 21 and spaced from the lower surface 12 of the solar panel 1. A clamping plate 23 is provided below the upper coupling plate 21 and is for clamping the lower surface 12 of the solar panel 1. A vertical plate 24 is connected between the upper coupling plate 21 and the lower coupling plate 22. The vertical plate 24 is non-planar and includes two arcuate protruding portions 241 facing the solar panel 1 coupled therewith. Recessed portions 242 are formed on a side opposite to the protruding portions 241.

The frame bodies 3 are disposed below the side frames 2 and fixedly connected with the lower coupling plates 22 by assembling components.

The sealing strip 4 is made of rubber or other soft waterproof material and is disposed between the side frames 2 of two adjacent solar panels 1 by tight fitting, bonding, or other suitable way, and the sealing strip 4 is disposed between the vertical plates 24 of the two adjacent side frames 2 to form vertically insulation. Furthermore, the sealing strip 4 includes two flanges 41 in a position corresponding to the two recessed portions 242 of the vertical plate 24 of the adjacent side frames 2 for sealing engagement with the two recessed portions 242. Furthermore, the sealing strip 4 includes a vertical section 42 disposed between the vertical plates 24 of two adjacent side frames 2. An upper sealing portion 43 protrudes from an upper end of the upper section 42, protrudes above the two adjacent side frames 2, and abuts two upper coupling plates 21.

In the present invention, the four side edges 13 of the solar plate 1 can be respectively inserted between the upper coupling plates 21 and the clamping plates 23 of four side frames 2 and then fixed by bonding or other suitable way. Furthermore, the vertical plate 24 of the side frame 2 of the present invention includes protruding portions 241 which can form ribs to increase the strength of the side frame 2 while increasing the bending strength of the side frame 2 and the solar panel 1.

In the present invention, a sealing strip 4 is in sealing engagement with two adjacent side frames 2. The assembly is easier and simpler than conventional structures requiring upper and lower assembling components. Furthermore, the sealing strip 4 is in sealing engagement with the non-planer vertical plate 24 of the side frame 2, achieving improved assembly stability and sealingness. Furthermore, water accumulated on the upper side of the solar panels 1 can be stopped by the flanges 41 of the sealing strips 4 and the recessed portions 242 of the side frames 2 which provide zigzag obstruction, rather than falling down to a position below the solar panels 1, achieving more reliable waterproof effect. Furthermore, the upper sealing portion 43 of the sealing strip 4 of the present invention can insulate the upper gap at the upper sides of two adjacent side frames 2, providing enhanced waterproof effect. Furthermore, the soft characteristics of the sealing strip 4 can provide the side frames 2 with thermal expansion/shrinkage or shock absorbing effect during earthquakes.

Figure 4:
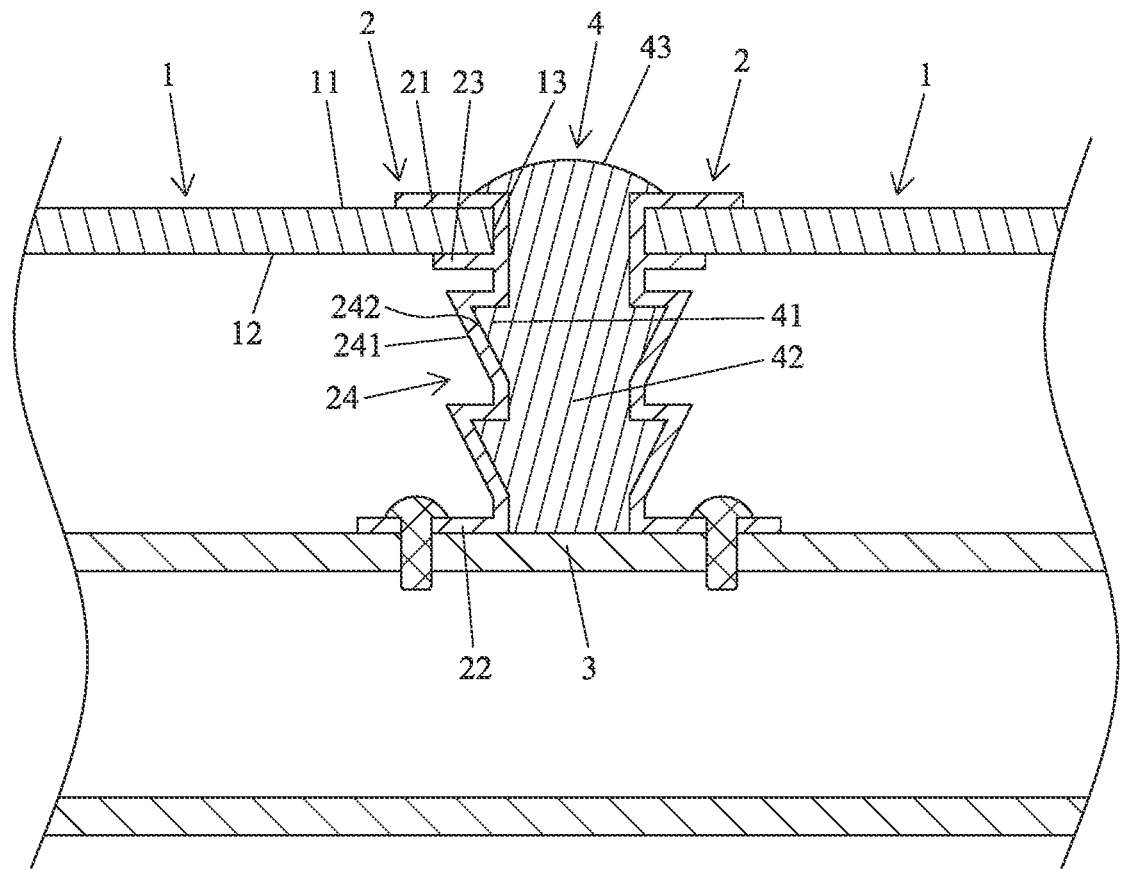
FIG. 4 is a cross-sectional view of a second embodiment of the present invention after assembly.

Please refer to FIG. 4 which is a second embodiment of the present invention. The second embodiment is similar to the first embodiment, with the difference being that the protruding portions 241 of the side frame 2 are inverted hooks having a shape different from the arcuate protruding portions of the first embodiment. Furthermore, the shape of the flanges 41 of the sealing strip 4 is different from that of the flanges in the first embodiment. Furthermore, different shape designs can have the effect required by the present invention.

Figure 5:
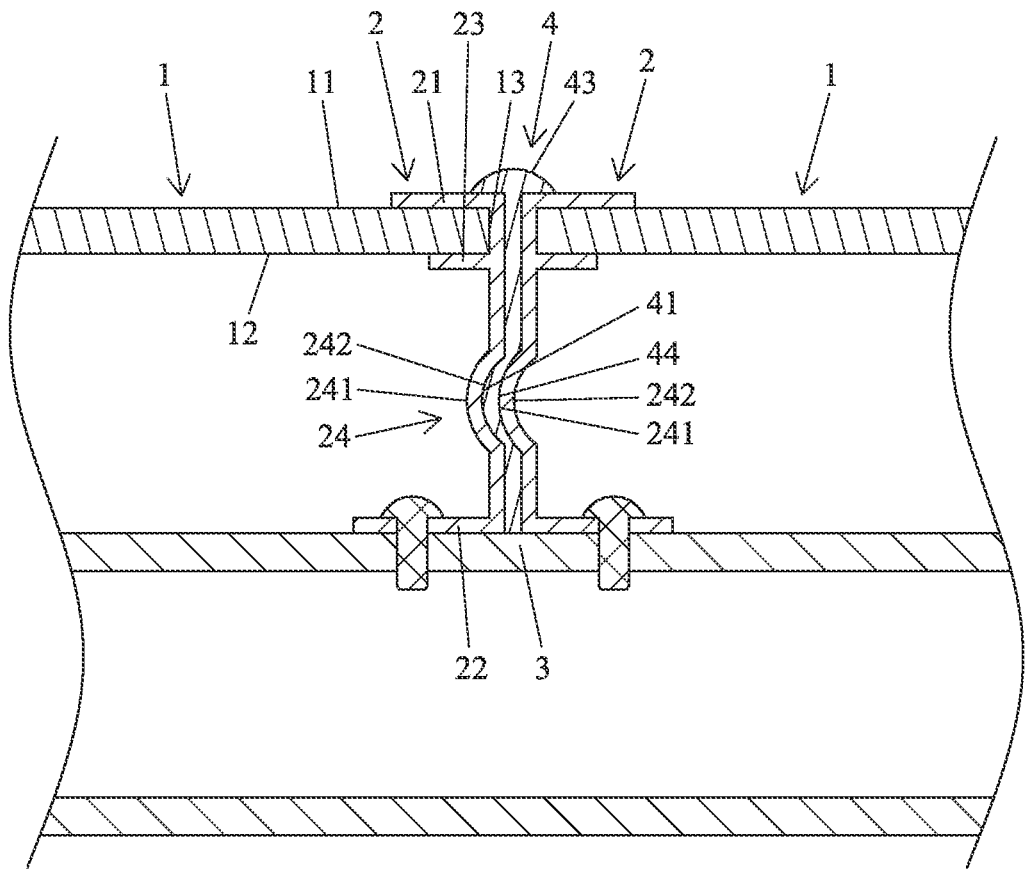
FIG. 5 is a cross-sectional view of a third embodiment of the present invention after assembly.

Please refer to FIG. 5 which is a third embodiment of the present invention. The third embodiment is similar to the first embodiment, with the difference being that the protruding portions 241 of the side frames 2 of two adjacent solar panels 1 respectively faces and faces away from the solar panels 1 coupled therewith, and the recessed portion 242 of one of the side frames 2 corresponds to a position of the protruding portion 241 of the other side frame 2. Furthermore, the sealing strip 4 includes a flange 241 for sealing engagement with the recessed portion 242 of one of the side frames 2 and a groove 44 for sealing engagement with the protruding portion 241 of the other side frame 2, achieving the waterproof effect required by the present invention. Furthermore, the assembly stability of two adjacent side frames 2 can be enhanced by the corresponding position of the protrusion 241 and the recessed portion 242.

Figure 6:
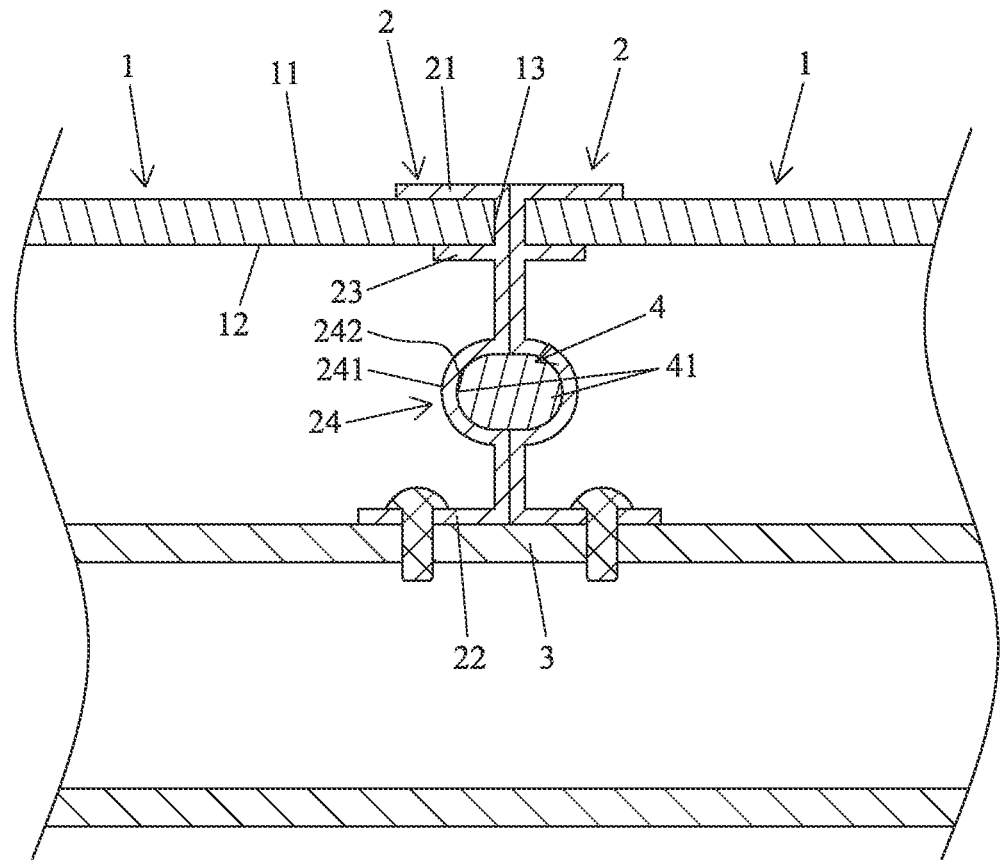
FIG. 6 is a cross-sectional view of a fourth embodiment of the present invention after assembly.

Please refer to FIG. 6 which is a fourth embodiment of the present invention. The fourth embodiment is similar to the first embodiment, with the difference being that the cross sections of the sealing strip 4 are elliptic cylindrical without the vertical section and the upper sealing portion of the first embodiment, and the sealing strip 4 can be in sealing engagement with the recessed portions 242 of the side frames 2 by the flange 41, achieving the waterproof effect required by the present invention.

Therefore, based on the above description, the present invention has assembly convenience and enhanced waterproof sealingness while increasing the strength of the side frames and the solar panels, achieving the buffering and shock-absorbing effect. Furthermore, the solar panel of the present invention may be directly assembled with the upper coupling plate of the side frame. The clamping plate of the side frame is not a necessary disposition. Furthermore, the foregoing embodiments are examples of the present invention, not limitation to the present invention. All equivalent changes made in accordance with the spirit of the present invention should also fall within the scope of the present invention.

The invention claimed is:

1. A solar panel frame waterproof structure comprising:
a plurality of solar panels, each solar panel being a rectangular cuboid and having an upper surface, a lower surface, and four side edges;
a plurality of side frames made of rigid material, each side frame disposed on one of the side edges of a corresponding solar panel, each side frame comprising:
an upper coupling plate parallel to the upper surface of the corresponding solar panel and coupled with the corresponding solar panel;
a lower coupling plate parallel to the upper coupling plate and spaced from the lower surface of the corresponding solar panel; and
a vertical plate extending between the upper coupling plate and the lower coupling plate, the vertical plate including at least one non-planar protruding portion on a first side and a non-planar recessed portion on a second side opposite the first side, the non-planar protruding portion facing the corresponding solar panel coupled to the upper coupling plate;
a plurality of frame bodies disposed below the solar panels, each of the plurality of frame bodies fixedly connected with the lower coupling plate of one of the plurality of side frames; and
a plurality of sealing strips made of soft waterproof material, each of the plurality of sealing strips disposed between the side frames of two adjacent solar panels of the plurality of solar panels and between the vertical plates of the two adjacent side frames to form insulation; and each of the plurality of sealing strips having a flange shaped to be received by the non-planar recessed portion of the vertical plate of the side frame for sealing engagement.

2. The solar panel frame waterproof structure of claim 1, wherein each of the sealing strips extends from a first end to a second end and each of the sealing strips has an upper sealing portion protruding at the first end above the two adjacent side frames, and a portion of the upper sealing portion abuts the upper coupling plates of the two adjacent side frames.

3. A solar panel frame waterproof structure comprising:
a first solar panel being a rectangular cuboid and having an upper surface, a lower surface, and four side edges;
a second solar panel, the second solar panel being a rectangular cuboid and having an upper surface, a lower surface, and four side edges;
a first side frame made of rigid material, the first side frame disposed on one of the side edges of the first solar panel, the first side frame comprising:
a first upper coupling plate parallel to the upper surface of the first solar panel and coupled with the first solar panel
a first lower coupling plate parallel to the first upper coupling plate and spaced from the lower surface of the first solar panel
a first vertical plate extending between the first upper coupling plate and the first lower coupling plate, the first vertical plate including at least one non-planar protruding portion on a first side and a non-planar recessed portion on a second side opposite the first side, the non-planar protruding portion facing toward the first solar panel;
a second side frame adjacent to the first side frame, the second side frame made of rigid material, the second side frame disposed on one of the side edges of the second solar panel, the second side frame comprising:
a second upper coupling plate parallel to the upper surface of the second solar panel and coupled with the second solar panel;
a second lower coupling plate parallel to the second upper coupling plate and spaced from the lower surface of the second solar panel
a second vertical plate extending between the second upper coupling plate and the second lower coupling plate, the second vertical plate having at least one non-planar protruding portion on a first side and a non-planar recessed portion on a second side opposite the first side, the non-planar protruding portion facing toward the first solar panel;
at least one frame body disposed below the first solar panel and the second solar panel and connected to the first lower coupling plate and the second lower coupling plate;
a sealing strip made of soft waterproof material, the sealing strip disposed between the first vertical plate and the second vertical plate to form insulation; and the sealing strip has a flange shaped to be received by the non-planar recessed portion of the first vertical plate for sealing engagement.

4. The solar panel frame waterproof structure of claim 1, wherein a clamping plate is provided on each side frame and below each upper coupling plate and is for clamping the lower surface of the corresponding solar panel.

5. The solar panel frame waterproof structure of claim 1, wherein the side frames are made of aluminum.

6. The solar panel frame waterproof structure of claim 1, wherein the sealing strips are made of rubber material.

7. The solar panel frame waterproof structure of claim 3, wherein the sealing strip extends from a first end to a second end and the sealing strip has an upper sealing portion protruding at the first end above the two adjacent side frames, and a portion of the upper sealing portion abuts the upper coupling plates of the two adjacent side frames.

8. The solar panel frame waterproof structure of claim 3, further comprising a clamping plate on each side frame below each upper coupling plate for clamping the lower surface of the corresponding solar panel.

9. The solar panel frame waterproof structure of claim 3, wherein the first and second side frames are made of aluminum.

10. The solar panel frame waterproof structure of claim 3, wherein the sealing strip is made of rubber material.

* * * * *